United States Patent
Ejzak et al.

(10) Patent No.: US 7,443,879 B2
(45) Date of Patent: Oct. 28, 2008

(54) COMMUNICATION BETWEEN USER AGENTS THROUGH EMPLOYMENT OF CODEC FORMAT UNSUPPORTED BY ONE OF THE USER AGENTS

(75) Inventors: Richard Paul Ejzak, Wheaton, IL (US); Hong Xie, Downers Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1135 days.

(21) Appl. No.: 10/295,775

(22) Filed: Nov. 14, 2002

(65) Prior Publication Data

US 2004/0095958 A1 May 20, 2004

(51) Int. Cl.
*H04J 3/16* (2006.01)
(52) U.S. Cl. .................. 370/465; 370/260; 370/349; 370/356; 370/446; 375/326; 375/327
(58) Field of Classification Search ............. 370/352, 370/338, 349, 356, 401, 446, 260; 375/326, 375/327
See application file for complete search history.

(56) References Cited

U.S. PATENT DOCUMENTS

| | | | | |
|---|---|---|---|---|
| 6,233,550 B1* | 5/2001 | Gersho et al. | ............ | 704/208 |
| 6,351,495 B1* | 2/2002 | Tarraf | ............ | 375/259 |
| 6,856,954 B1* | 2/2005 | Su | ............ | 704/212 |
| 7,142,532 B2* | 11/2006 | Penfield et al. | ............ | 370/352 |
| 7,170,863 B1* | 1/2007 | Denman et al. | ............ | 370/260 |
| 2002/0176404 A1* | 11/2002 | Girard | ............ | 370/352 |
| 2002/0191596 A1* | 12/2002 | Moyano et al. | ............ | 370/352 |
| 2003/0097447 A1* | 5/2003 | Johnston | ............ | 709/227 |
| 2003/0219006 A1* | 11/2003 | Har | ............ | 370/352 |
| 2004/0047437 A1* | 3/2004 | Hamiti et al. | ............ | 375/326 |
| 2004/0101125 A1* | 5/2004 | Graf et al. | ............ | 379/229 |
| 2004/0240399 A1* | 12/2004 | Corrao et al. | ............ | 370/260 |
| 2005/0027517 A1* | 2/2005 | Jabri et al. | ............ | 704/219 |
| 2005/0232232 A1* | 10/2005 | Farber et al. | ............ | 370/352 |

OTHER PUBLICATIONS

3GPP Organizational Partners; IP Multimedia Subsystem (IMS), Stage 2 (Release 5); ARIB STD-T63-23.228 V5.4.0; http://www.3gpp.org; Mar. 2002; Release 5; 3GPP. 650 Route des Lucioies-Sophia Antipolis Valbonne, France.

"Request for Comments"; http://www.ietf.org/rfc.html;IETF, 1895 Preston White Drive, Suite 100, Reston, VA 20191-5434, USA; 1 pg; Nov. 14, 2002.

"SDP:Session Description Protocol"; http://www.ieft.org/rfc/rfc2327.txt?number=2327; IETF, 1895 Preston White Drive, Suite 100, Reston, VA 20191-5434, USA; 37pgs; Nov. 14, 2002.

"Conventions for the use of the Session Description Protocol (SDP) for ATM Bearer Connections", http://www.ietf.org/rfc/rfc3108.txt?number=3108; IETF, 1895 Preston White Drive, Suite 100, Reston, VA 20191-5434, USA; 97pgs; Nov. 14, 2002.

(Continued)

*Primary Examiner*—Edan Orgad
*Assistant Examiner*—Andrew C Lee

(57) ABSTRACT

An apparatus in one example comprises one or more network controllers that serve to allow a second user agent to communicate with a first user agent through employment of a codec format unsupported by the first user agent.

16 Claims, 9 Drawing Sheets

OTHER PUBLICATIONS

"An Offer/Answer Model with the Session Description Protocol (SDP)"; http://www.ietf.org/rfc/rfc3264.txt?number=3264; IETF, 1895 Preston White Drive, Suite 100, Reston, VA 20191-5434, USA; 22pgs; Nov. 14, 2002.

"SIP: Session Initiation Protocol"; http://www.ietf.org/rfc/rfc3261.txt?number=3261; IETF, 1895 Preston White Drive, Suite 100, Reston, VA 20191-5434, USA; 236 pgs; Nov. 14, 2002.

* cited by examiner

COMMUNICATION BETWEEN USER AGENTS THROUGH EMPLOYMENT OF CODEC FORMAT UNSUPPORTED BY ONE OF THE USER AGENTS

CROSS-REFERENCE TO RELATED APPLICATIONS

This application contains subject matter which is related to the subject matter of the following applications and U.S. patents, which are assigned to the same assignee as this application. The below-listed applications and U.S. patents are hereby incorporated herein by reference in their entireties:

"COMMUNICATION SYSTEM INCLUDING AN INTERWORKING MOBILE SWITCHING CENTER FOR CALL ORIGINATION," by Ejzak., Ser. No. 09/919,651, filed Jul. 31, 2001.

"COMMUNICATION SYSTEM INCLUDING AN INTERWORKING MOBILE SWITCHING CENTER FOR CALL TERMINATION,"by Ejzak, U.S. Pat. No.6, 996,087, filed Jul. 31, 2001.

"COMMUNICATION SYSTEM FOR PROVIDING ROAMING BETWEEN AN INTERNET PROTOCOL MULTIMEDIA SYSTEM AND A CIRCUIT-SWITCHED DOMAIN," by Ejzak, U.S. Pat. No. 6,871, 070, filed Jul. 31, 2001.

"PROVISION OF SERVICES IN A COMMUNICATION SYSTEM INCLUDING AN INTERWORKING MOBILE SWITCHING CENTER," by Ejzak, U.S. Pat. No. 6,954,654, filed Jul. 31, 2001.

"INTERNET PROTOCOL MULTIMEDIA SUBSYSTEM COMPONENT PROVIDING OF PACKET-SWITCHED SWITCHING FUNCTIONS TO SERVING MOBILE SWITCHING CENTER FEATURE SERVER," by Cyr, et al., U.S. Pat. No. 7,031,747, filed Nov. 14, 2002.

"NETWORK CONTROLLER REPLACEMENT OF INDICATION OF ONE OR MORE SPECIFIC NETWORK CONNECTIONS USABLE BY FIRST NETWORK COMPONENT IN SIGNALING MESSAGE FOR SECOND NETWORK COMPONENT WITH WILD CARD NETWORK CONNECTION INFORMATION," by Ejzak, et al., co-filed herewith.

TECHNICAL FIELD

The invention relates generally to communications and more particularly to wireless communications.

BACKGROUND

Service providers are evolving the existing time division multiplexing ("TDM") based circuited networks to packet-based networks and eventually to end-to-end internet protocol telephony applications using session initiation protocol ("SIP") as the signaling protocol. A typical session initiation protocol network architecture may consist of one or more session initiation protocol back-to-back user agents ("B2BUA") and session initiation protocol user agents ("UA"). The session initiation protocol user agents employ specific coder-decoder ("codec") formats to communicate with other network entities. The session initiation protocol user agents employ codec negotiation to set up communication with other session initiation protocol user agents.

Several network configurations exist that require codec negotiation. Exemplary configurations include a wireless telephone to public switched telephone network ("PSTN") call, a wireless telephone to wireless telephone call when the wireless telephones employ a compatible codec format, and a wireless telephone to wireless telephone call when the wireless telephones employ different codec formats.

As one shortcoming, a session initiation protocol user agent employing one codec format cannot communicate with a session initiation protocol user agent employing a different codec format. Different session initiation protocol user agents may employ different codec formats. For example, wireless session initiation protocol user agents may support codec formats such as adaptive multi-rate ("AMR"), global system for mobile communications full rate ("GSM FR"), global system for mobile communications half rate ("GSM HR"), enhanced variable rate codec ("EVRC"), Qualcomm code excited linear prediction ("QCELP" or "13k"), and/or selectable mode vocoder ("SMV"). Landline session initiation protocol user agents may support the codec formats of the wireless session initiation protocol user agents as well as other codec formats typically used in landline networks, such as G.711, and/or adaptive differential pulse code modulation ("ADPCM"). The session initiation protocol employs session description protocol ("SDP") offer/answer procedures to perform media codec negotiation between session initiation protocol user agents in a session initiation protocol network. If the session initiation protocol user agents do not support one or more common codec formats, then session initiation protocol cannot successfully establish a communication session between the session initiation protocol user agents.

Thus, a need exists for enhanced codec negotiation in a variety of network architecture configurations.

SUMMARY

The invention in one implementation encompasses an apparatus. The apparatus comprises one or more network controllers that serve to allow a second user agent to communicate with a first user agent through employment of a codec format unsupported by the first user agent.

Another implementation of the invention encompasses a method. Through one or more network controllers a second user agent is allowed to communicate with a first user agent through employment of a codec format unsupported by the first user agent.

Yet another implementation of the invention encompasses an article. The article comprises one or more computer-readable signal-bearing media. The article comprises means in the one or more media for allowing through one or more network controllers a second user agent to communicate with a first user agent through employment of a codec format unsupported by the first user agent.

DESCRIPTION OF THE DRAWINGS

Features of exemplary implementations of the invention will become apparent from the description, the claims, and the accompanying drawings in which:

DETAILED DESCRIPTION

Figure 1:
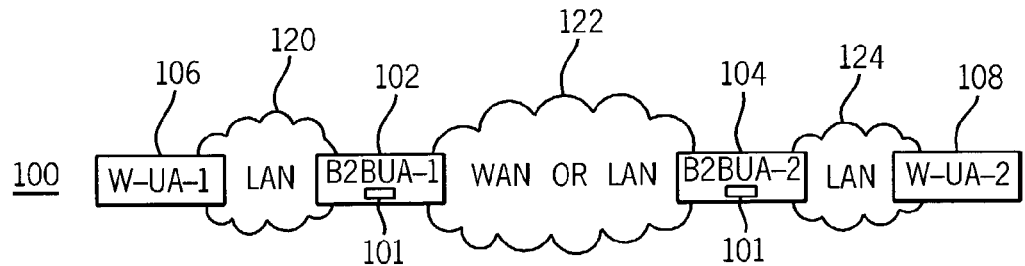
FIG. 1 is a representation of one example of an apparatus that comprises one or more network controllers, the one or more network controllers communicatively couple a plurality of wireless user agents.

Turning to FIGS. 1-4, an apparatus 100 in one example comprises one or more network controllers that serve to allow a first user agent to communicate with a second user agent through employment of a coder-decoder ("codec") format that is unsupported by the second user agent. The apparatus 100 includes a plurality of components such as computer software and/or hardware components. A number of such components can be combined or divided in the apparatus 100.

In one example, the apparatus 100 employs one or more computer-readable signal-bearing media. One example of a computer-readable signal-bearing medium for the apparatus 100 comprises an instance of a recordable data storage medium 101 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

The apparatus 100 in one example comprises one or more network controllers 102 and 104. The one or more network controllers 102 and 104 communicatively couple a plurality of user agents ("UAs"). The plurality of user agents comprise wireless user agents 106 and 108, and landline user agents 110 and 112. The plurality of user agents send messages over one or more networks 120, 122, 124, 126, and 128.

The one or more network controllers 102 and 104, in one example, comprise session initiation protocol ("SIP") back to back user agents ("B2BUA"). The one or more network controllers 102 and 104 communicate using a signaling protocol, for example, session initiation protocol or bearer independent call control ("BICC"). The plurality of user agents employ the one or more network controllers 102 and 104 to receive and process offer/answer messages during communication setup. The offer/answer messages comprise session description protocol ("SDP") communication messages encapsulated in session initiation protocol or bearer independent call control signaling messages. An offer message of the offer/answer messages comprises a description of the media capabilities of an offering user agent to an answering user agent to initiate communication. An answer message of the offer/answer messages comprises a response to the offer, for example, the answering user agent may accept the offer with a description of its own capabilities, or may decline the offer.

The one or more network controllers 102 and 104 have access to network resources, for example, translator components or transcoders. The translator components are able to convert media from one format to another format. For example, the translator components are able to convert media of a first codec format to media of a second codec format. The one or more network controllers 102 and 104 may have access to network resources able to convert between a plurality of codec formats, for example, adaptive multi-rate ("AMR"), global system for mobile communications full rate ("GSM FR"), global system for mobile communications half rate ("GSM HR"), enhanced variable rate codec ("EVRC"), Qualcomm code excited linear prediction ("QCELP" or "13k"), and/or selectable mode vocoder ("SMV").

The wireless user agents 106 and 108 comprise a communication component for a wireless telephone, computer, or personal digital assistant ("PDA"). In one example, wireless user agent 106 comprises a wireless telephone supporting the session initiation protocol. In another example, the wireless user agent 106 comprises a wireless telephone communicating through an inter-working function ("IWF") that supports the session initiation protocol. The wireless user agents 106 and 108 support one or more wireless codec formats, for example, one or more of adaptive multi-rate, global system for mobile communications full rate, enhanced variable rate codec, and/or selectable mode vocoder.

The landline user agents 110 and 112 comprise a communication component for a landline telephone or computer. The landline user agents 110 and 112 support one or more network codec formats, for example, one or more of G.711, or adaptive differential pulse code modulation. The landline user agents 110 and 112 may additionally support the one or more wireless codec formats. In one example, the landline user agents 110 and 112 comprise a media gateway control function ("MGCF") as defined in third generation partnership project ("3GPP") internet protocol multimedia subsystem ("IMS").

The media gateway control function has access to the network resources. The translator components of the network resources may convert media from one format to another format. The media gateway control function also provides interworking between signaling messages in one format to signaling messages in another format. For example, the media gateway control function is able to interwork session initiation protocol procedures and messages with bearer independent call control procedures and messages or integrated services digital network user part procedures and messages.

The networks 120 and 124 comprise local area networks ("LANs"). The networks 120 and 124 communicatively couple the wireless user agents 106 and 108 to the respective one or more network controllers 102 and 104. The network 122 comprises a local area network, a metropolitan area network ("MAN"), or a wide area network ("WAN"). In one example, illustrated in FIG. 1, the network 122 communicatively couples the one or more network controllers 102 and 104. In another example, illustrated in FIGS. 2 and 3, the network 122 communicatively couples one of the one or more network controllers 102 and 104 to one of the landline user agents 110 and 112. In yet another example, illustrated in FIG. 4, the network 122 communicatively couples the landline user agents 110 and 112. The networks 126 and 128 comprise public switched telephone networks ("PSTNs") or packet data networks ("PDNs"). The networks 126 and 128 communicatively couple landline telephones to the respective landline user agents 110 and 112.

An illustrative description of exemplary operation of the apparatus 100 is now presented, for explanatory purposes. The illustrative description shows the operation of the apparatus 100 for one media type, for example, voice calls. Other types of media such as text, data, and video, could substitute for the voice calls or could use a separate media line to set up communication concurrently. The illustrative description shows one connection requirement, for example, how codec negotiation is accomplished. Other types of connection requirements such as network type negotiation, network address negotiation, and port number negotiation are also exchanged in the offer/answer messages. The illustrative description shows how one codec format is selected. Multiple codec format selections may also be accommodated by including one or more codec formats in the answer message. The illustrative description shows the operation of the apparatus 100 for one media format, for example, the audio codec format. Other types of media formats such as dual-tone multi-frequency ("DTMF") indications may be included in the offer/answer messages.

The illustrative description shows how the offer/answer messages set up communication between the offering user agent and the answering user agent using one or more codec formats. The offering user agent comprises one of the wireless user agent 106 and the landline user agent 110. The answering user agent comprises one of the wireless user agent 108 and the landline user agent 112. The offering user agent generates the offer message. The offer message comprises a list of codec formats supported by the offering user agent. The codec formats in the list are arranged into an order based on a preference of the offering user agent. For example, the first codec format listed is the most preferred codec format and the last codec format listed is the least preferred codec format supported by the offering user agent. The order based on the preference of the offering user agent is determined by the relative quality of the codec format. For example, in voice calls, the codec format with the greatest voice quality will be the most preferred codec format and the codec format with the worst voice quality will be the least preferred codec format.

The offering user agent sends the offer message including the list to the one or more network controllers 102 and 104. If the one or more network controllers 102 and 104 support a codec format that is not included in the list, then the one or more network controllers 102 and 104 append the list with the codec format that is not included in the list. If the one or more network controllers 102 and 104 do not support a codec format that is included in the list, then the one or more network controllers 102 and 104 delete from the list the codec format that is not supported by the one or more network controllers 102 and 104. A codec formats that is not supported by the one or more network controllers 102 and 104 is not usable for communication between the offering and answering user agents.

The one or more network controllers 102 and 104 send the offer message including the list to the answering user agent. The answering user agent selects a codec format from the list which is the most preferred codec format on the list that is supported by the answering user agent. For example, the answering user agent compares the first codec format in the list with the codec formats supported by the answering user agent. If the first codec format in the list is supported by the answering user agent, then the answering user agent selects the first codec format for communication with the offering user agent. If the first codec format in the list is not supported by the answering user agent, then the answering user agent moves down the list in order of preference until a codec format of the list is reached that is supported by the answering user agent. Once the codec format is selected, the answering user agent generates the answer message comprising an indication of the codec format selected from the list which is the most preferred codec on the list that is supported by the answering user agent.

The answering user agent sends the answer message towards the offering user agent via the one or more network controllers 102 and 104. The one or more network controllers 102 and 104 determine if the codec format selected by the answering user agent is supported by the offering user agent. For example, the one or more network controllers 102 and 104 determine if the codec format selected by the answering user agent is on the list of codec formats supported by the offering user agent. If the codec format selected by the answering user agent is supported by the offering user agent, then communication can proceed between the offering user agent and the answering user agent. If the codec format selected by the answering user agent is not supported by the offering user agent, then a translator component of the translator components needs to be allocated to communicatively couple the offering user agent and the answering user agent. In one example, the one or more network controllers 102 and 104 attempt to reduce the use of unnecessary translator components. Reducing the use of unnecessary translator components increases the quality of the communication and reduces the use of network resources. The one or more network controllers 102 and 104 attempt to settle on a codec format common to the offering and answering user agents or a codec format common to the offering and answering user agents through use of the translator components. In one example, the one or more network controllers 102 and 104 attempt to settle on the common codec format with use of one offer message sequence and one answer message sequence (i.e., one round of codec negotiation).

Referring to FIG. 1, the network controller 102 and the network controller 104 are positioned between the offering user agent and the answering user agent. The network controller 102 and/or the network controller 104 may allocate the translator component. In one example, the offering user agent comprises the wireless user agent 106 and the answering user agent comprises the wireless user agent 108. The wireless user agent 108 sends the answer message to the network controller 104. The network controller 104 makes a decision whether to allocate the translator component. If the network controller 104 inserts the translator component, then the network controller 104 modifies the answer message to include the selected codec and sends the modified answer message to the network controller 102. If the network controller 104 inserts the translator component, then the network controller 104 sends the answer message to the network controller 102.

In one example, the decision is based on the availability of the network resources, such as the translator component. For example, if the translator component available to the network controller 104 is busy, then the network controller 104 sends the answer message to the network controller 102.

In another example, the decision is based on one or more characteristics of the codec format selected by the answering user agent and the codec formats supported by the offering user agent. For example, to increase network efficiency it is desirable to propagate media using a codec format that requires fewer bits to represent the message than a codec format that requires more bits to represent the message. If the codec format selected by the answering user agent uses fewer bits to communicate data than the preferred codec format of the offering user agent, then the network controller 104 will send the answer message to the network controller 102 without allocating the translator component. The network controller 102 allocates the translator component to translate between media formats of the user agents 106 and 108. If the codec format selected by the answering user agent uses more bits to communicate data than the preferred codec format of the offering user agent, then the network controller 104 will allocate the translator component and modify the answer message to the codec format of the offering user agent before sending the answer message to the network controller 102. Once the answer message has set up communication through a specific coder format route, messages associated with the communication will follow the specific coder format route until the specific coder format route changes or the communication is terminated.

Figure 2:
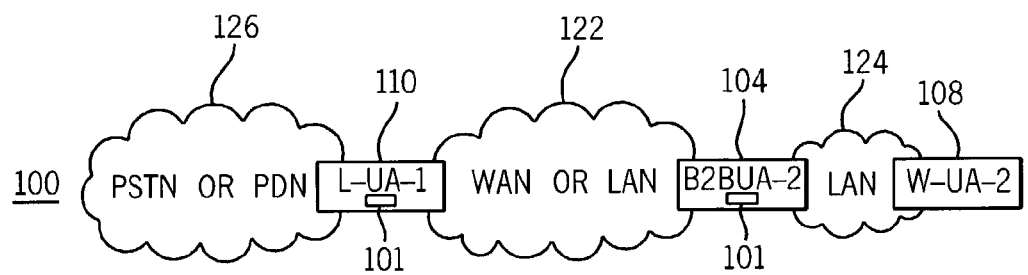
FIG. 2 is a representation of one example of an apparatus that comprises one or more network controllers, the one or more network controllers communicatively couple a plurality of user agents, the plurality of user agents comprise wireless user agents and landline user agents.
Figure 3:
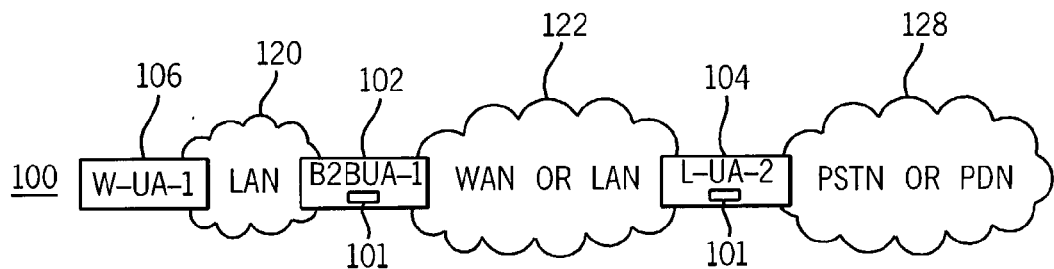
FIG. 3 is a representation of one example of an apparatus that comprises one or more network controllers, the one or more network controllers communicatively couple a plurality of user agents, the plurality of user agents comprise wireless user agents and landline user agents.

Referring to FIGS. 2 and 3, only one of the one or more network controllers 102 and 104 are positioned between the offering user agent and the answering user agent. If the codec formats of the offering user agent and the answering user agent differ, to communicatively couple the offering user agent and the answering user agent the one of the one or more network controllers 102 and 104 must allocate the translator component. The translator component translates the media format to the codec format of the offering user agent.

Figure 5:
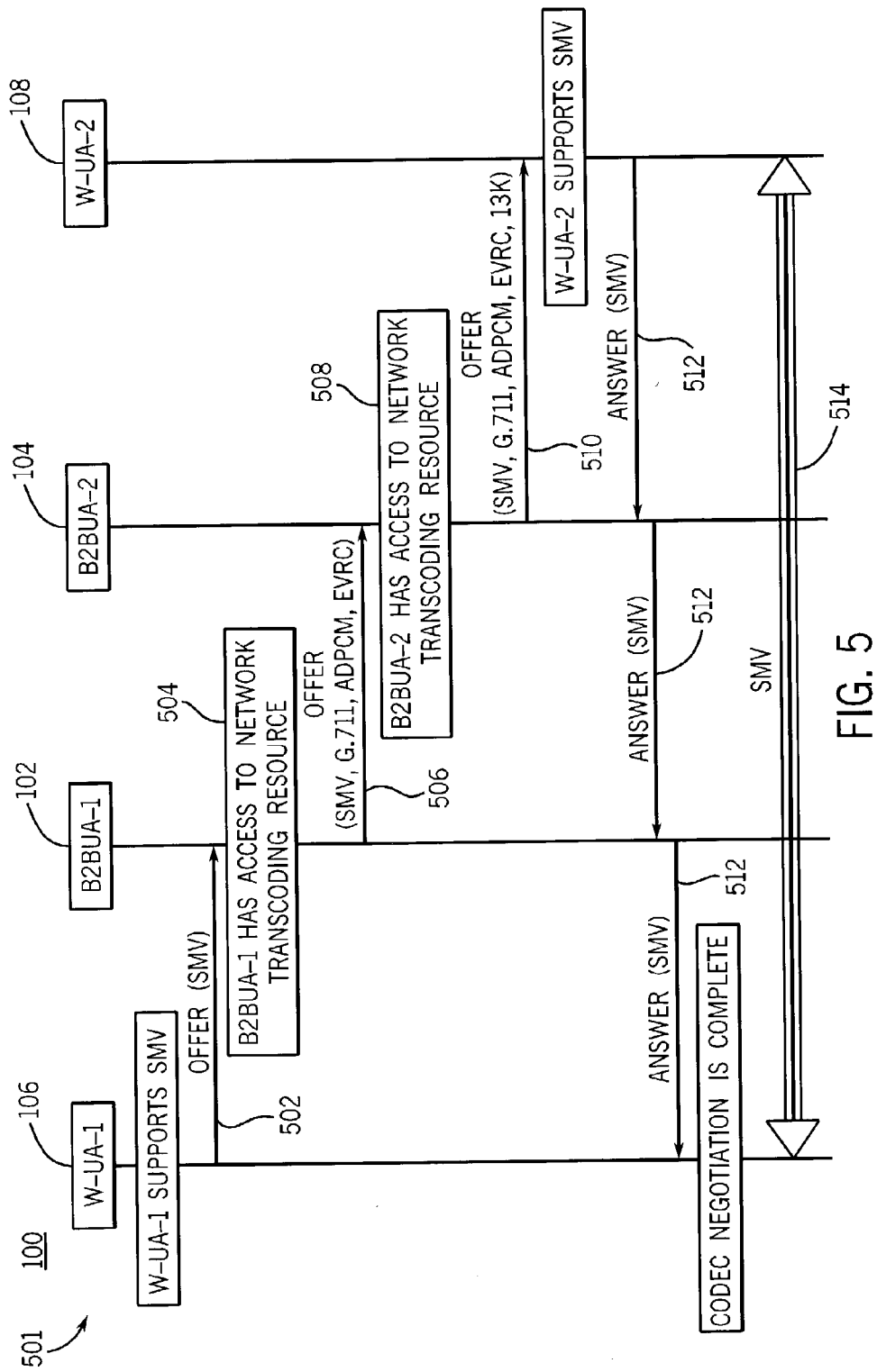
FIG. 5 is a representation of an exemplary message flow for a connection of a call from a first wireless user agent to a second wireless user agent of the plurality of wireless user agents of the apparatus of FIG. 1.

Turning to FIGS. 1 and 5, a call flow 501 represents exemplary connection of a call from the wireless user agent 106 to the wireless user agent 108. A user initiates the call with the wireless telephone associated with the wireless user agent 106. The wireless user agent 106 generates an offer message 502. The offer message 502 comprises a list of codec formats supported by the wireless user agent 106. When the wireless user agent 106 supports more than one codec format, the codec formats in the list are arranged into an order based on a preference of the wireless user agent 106. In one example, the wireless user agent 106 supports only one codec format, for example, selectable mode vocoder. The wireless user agent 106 includes an indication in the offer message 502 that the selectable mode vocoder codec format is supported.

The wireless user agent 106 sends the offer message 502 to the network controller 102. The network controller 102 has access to network transcoder resources 504 and therefore may support a codec format that is not supported by the wireless user agent 106. In one example, the network controller 102 supports the selectable mode vocoder, G.711, adaptive differential pulse code modulation, enhanced variable rate codec formats. The network controller 102 generates an offer message 506. The network controller 102 includes an indication in the offer message 506 that the selectable mode vocoder, G.711, adaptive differential pulse code modulation, enhanced variable rate codec formats are supported. The network controller 102 arranges the codec formats into an order by appending the codec formats supported by the network controller 102 and unsupported by the wireless user agent 106 to the end of the list of codec formats supported by the wireless user agent 106.

The network controller 102 sends the offer message 506 to the network controller 104. The network controller 104 has access to network transcoder resources 508 and therefore may support a codec format that is not supported by the wireless user agent 106 or the network controller 102. In one example, the network controller 104 supports the 10 selectable mode vocoder, G.711, adaptive differential pulse code modulation, enhanced variable rate codec, and 13k codec formats. The network controller 104 generates an offer message 510. The network controller 104 includes an indication in the offer message 510 that the selectable mode vocoder, G.711, adaptive differential pulse code modulation, enhanced variable rate codec, and 13k codec formats are supported. The network controller 104 arranges the codec formats into an order by appending the codec formats supported by the network controller 104 and unsupported by the wireless user agent 106 and network controller 102 to the end of the list of codec formats supported by the network controller 102.

The network controller 104 sends the offer message 510 to the wireless user agent 108. The wireless user agent 108 compares the first codec format in the list (i.e., selectable mode vocoder) with the codec formats supported by the wireless user agent 108. The wireless user agent 108 supports the selectable mode vocoder codec format, therefore wireless user agent 108 selects the selectable mode vocoder codec format for communication with the wireless user agent 106. The wireless user agent 108 generates an answer message 512 comprising an indication of the selectable mode vocoder codec format.

The wireless user agent 108 sends the answer message 512 to the network controller 104. The network controller 104 determines that the selectable mode vocoder codec format of the answer message 512 is supported by the wireless user agent 106 and the network controller 102. Therefore, there is no need to allocate a translator component to translate the selectable mode vocoder codec format of the answer message 512 to a different codec format.

The network controller 104 sends the answer message 512 to the network controller 102. The network controller 102 determines that the selectable mode vocoder codec format of the answer message 512 is supported by the wireless user agent 106. Therefore, there is no need to allocate a translator component to translate the selectable mode vocoder codec format of the answer message 512 to a different codec format.

The network controller 102 sends the answer message 512 to the wireless user agent 106. The selectable mode vocoder codec format has been determined to be common to both of the wireless user agents 106 and 108. Communication may begin between the wireless user agents 106 and 108 using a selectable mode vocoder codec format path 514.

Figure 6:
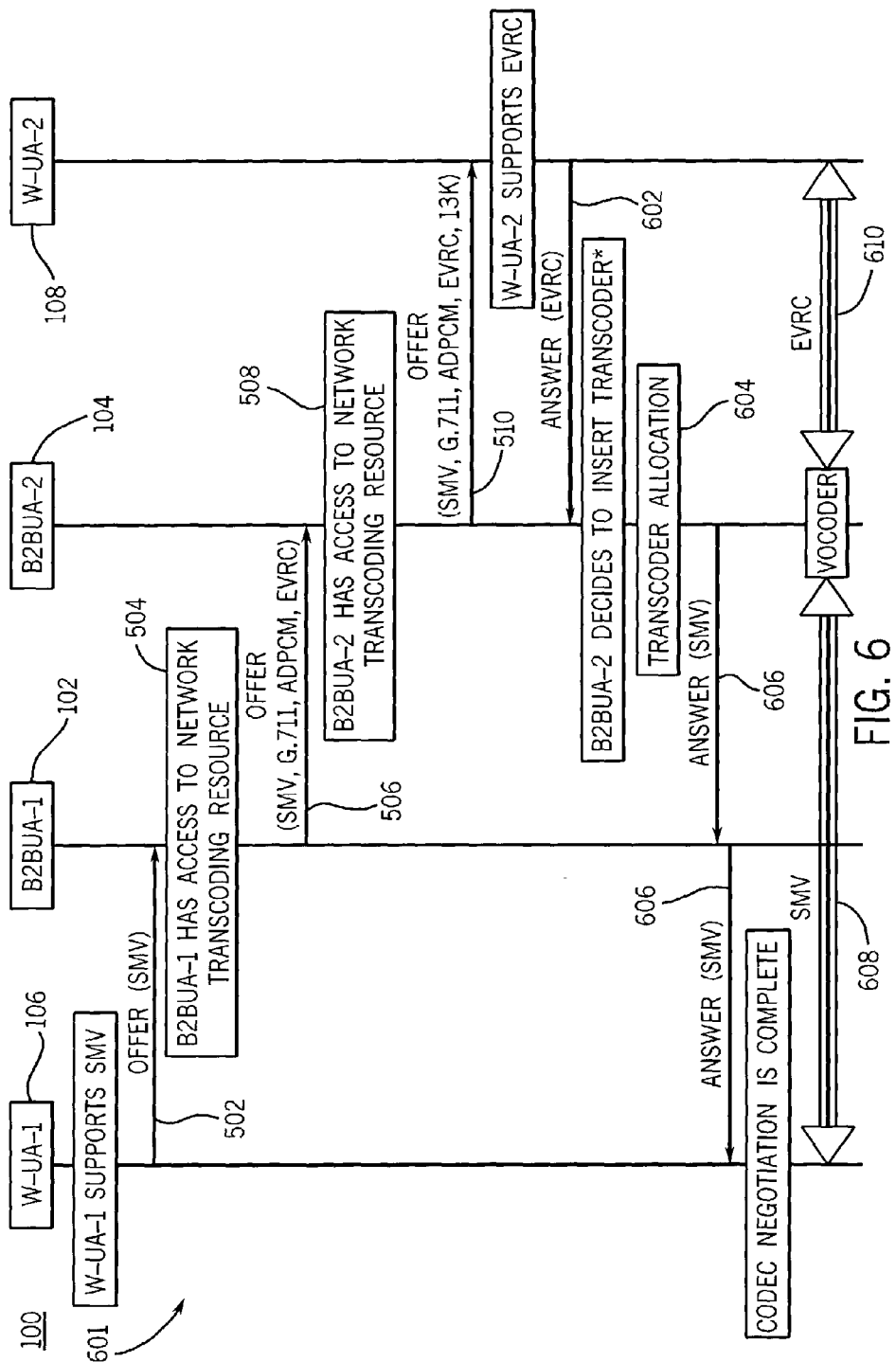
FIG. 6 is a representation of an exemplary message flow for a connection of another call from a first wireless user agent to a second wireless user agent of the plurality of wireless user agents of the apparatus of FIG. 1.

Turning to FIGS. 1 and 6, a call flow 601 represents exemplary connection of another call from the wireless user agent 106 to the wireless user agent 108. A user initiates the call with the wireless telephone associated with the wireless user agent 106. The wireless user agent 108 generates the offer message 502. The wireless user agent 106 sends the offer message 502 to the network controller 102. The network controller 102 sends the offer message 506 to the network controller 104. The network controller 104 sends the offer message 510 to the wireless user agent 108. The offer message 510 comprises the indication that the selectable mode vocoder, G.711, adaptive differential pulse code modulation, enhanced variable rate codec, and 13k codec formats are supported.

The wireless user agent 108 compares the first codec format in the list (i.e., selectable mode vocoder) with the codec formats supported by the wireless user agent 108. The wireless user agent 108 does not support the selectable mode vocoder codec format, therefore wireless user agent 108 compares the rest of the codec formats in the list with the codec formats supported by the wireless user agent 108. The wireless user agent 108 finds a codec format from the list that is supported by the wireless user agent 108 (i.e., enhanced variable rate codec). The wireless user agent 108 selects the enhanced variable rate codec format for communication with the wireless user agent 106. The wireless user agent 108 generates an answer message 602 comprising an indication of the enhanced variable rate codec format.

The wireless user agent 108 sends the answer message 602 to the network controller 104. The network controller 104 determines that the enhanced variable rate codec format of the answer message 512 is not supported by the wireless user agent 106. Therefore, there is a need for a translator component 604 to translate the enhanced variable rate codec format of the answer message 602 to the selectable mode vocoder codec format supported by the wireless user agent 106. The network controller 104 allocates the translator component 604. The translator component 604 translates the answer message 602 into an answer message 606. The answer message 606 indicates the selectable mode vocoder codec format. In one example, the translator component 604 comprises a vocoder.

The network controller 104 sends the answer message 606 to the network controller 102. The network controller 102 determines that the selectable mode vocoder codec format of the answer message 606 is supported by the wireless user agent 106. Therefore, there is no need to allocate a translator component to translate the selectable mode vocoder codec format to a different codec format.

The network controller 102 sends the answer message 606 to the wireless user agent 106. During communication the wireless user agent 106 uses the selectable mode vocoder codec format and the wireless user agent 108 uses the enhanced variable rate codec format. Communication may begin between the wireless user agent 106 and the translator component 604 using a selectable mode vocoder codec format path 608. Communication may begin between the wireless user agent 108 and the translator component 604 using a enhanced variable rate codec format path 610.

Figure 7:
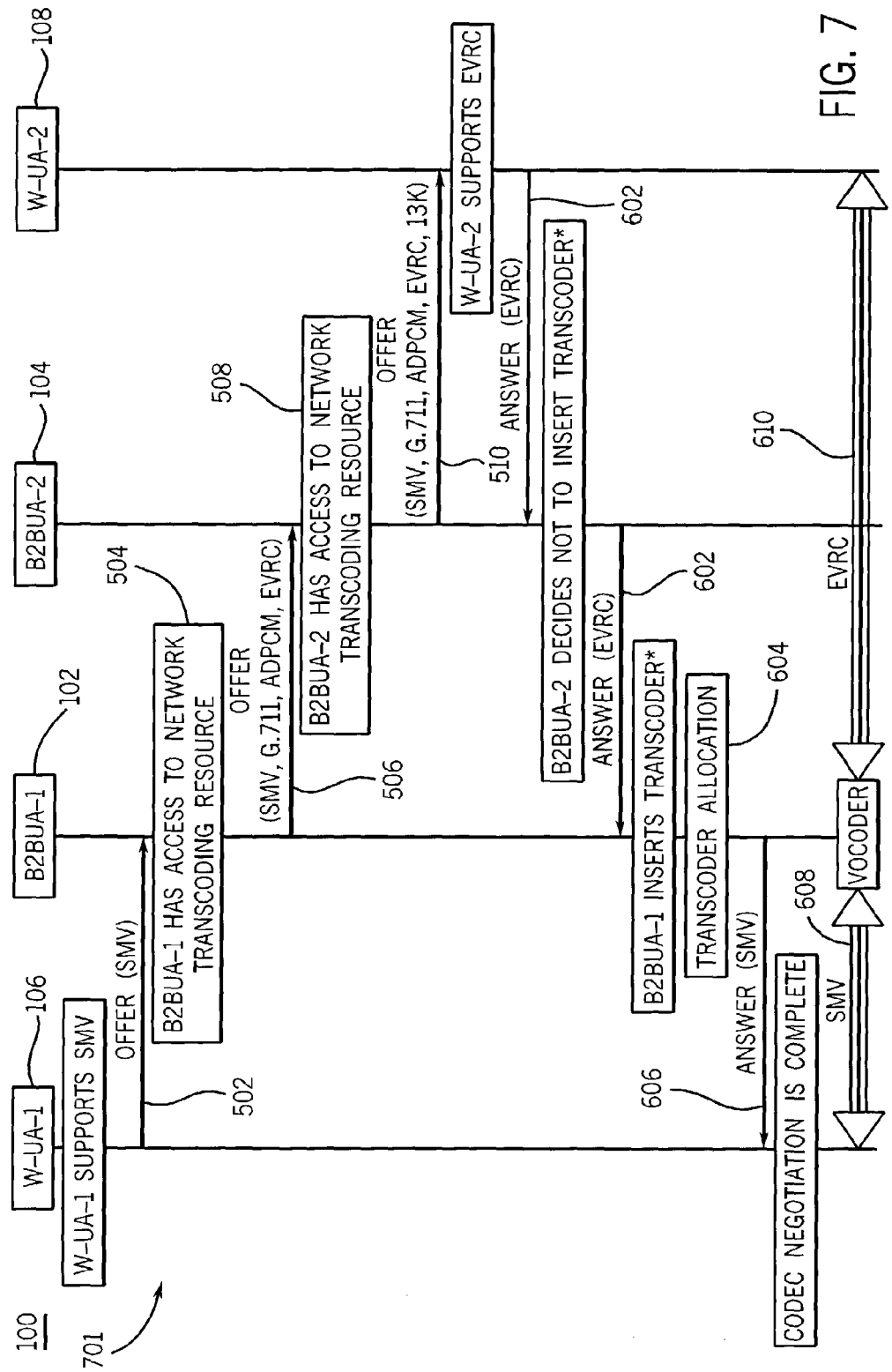
FIG. 7 is a representation of an exemplary message flow for a connection of yet another call from a first wireless user agent to a second wireless user agent of the plurality of wireless user agents of the apparatus of FIG. 1.

Turning to FIGS. 1 and 7, a call flow 701 represents exemplary connection of yet another call from the wireless user agent 106 to the wireless user agent 108. A user initiates the call with the wireless telephone associated with the wireless user agent 106. The wireless user agent 108 generates the offer message 502. The wireless user agent 106 sends the offer message 502 to the network controller 102. The network controller 102 sends the offer message 506 to the network controller 104. The network controller 104 sends the offer message 510 to the wireless user agent 108. The offer message 510 comprises the indication that the selectable mode vocoder, G.711, adaptive differential pulse code modulation, enhanced variable rate codec, and 13k codec formats are supported.

The wireless user agent 108 sends an answer message 602 comprising an indication of a selection of the enhanced variable rate codec format to the network controller 104. The network controller 104 determines that the enhanced variable rate codec format of the answer message 602 is not supported by the wireless user agent 106. Due to one or more characteristics of the answer message 602 or the availability of the network transcoder resources 508, the network controller 104 decides to send the answer message 602 to the network controller 102 without allocating the translator component.

The network controller 102 determines that the enhanced variable rate codec format of the answer message 602 is not supported by the wireless user agent 106. Therefore, there is a need for the translator component 604 to translate the enhanced variable rate codec format to the selectable mode vocoder codec format supported by the wireless user agent 106. The network controller 102 allocates the translator component 604. The translator component 604 translates the media format between enhanced variable rate codec format and selectable mode vocoder codec format. In one example, the translator component 604 comprises a vocoder.

The network controller 102 sends the answer message 606 to the wireless user agent 106. During communication the wireless user agent 106 uses the selectable mode vocoder codec format and the wireless user agent 108 uses the enhanced variable rate codec format. Communication may begin between the wireless user agent 106 and the translator component 604 using the selectable mode vocoder codec format path 608. Communication may begin between the wireless user agent 108 and the translator component 604 using the enhanced variable rate codec format path 610.

Figure 8:
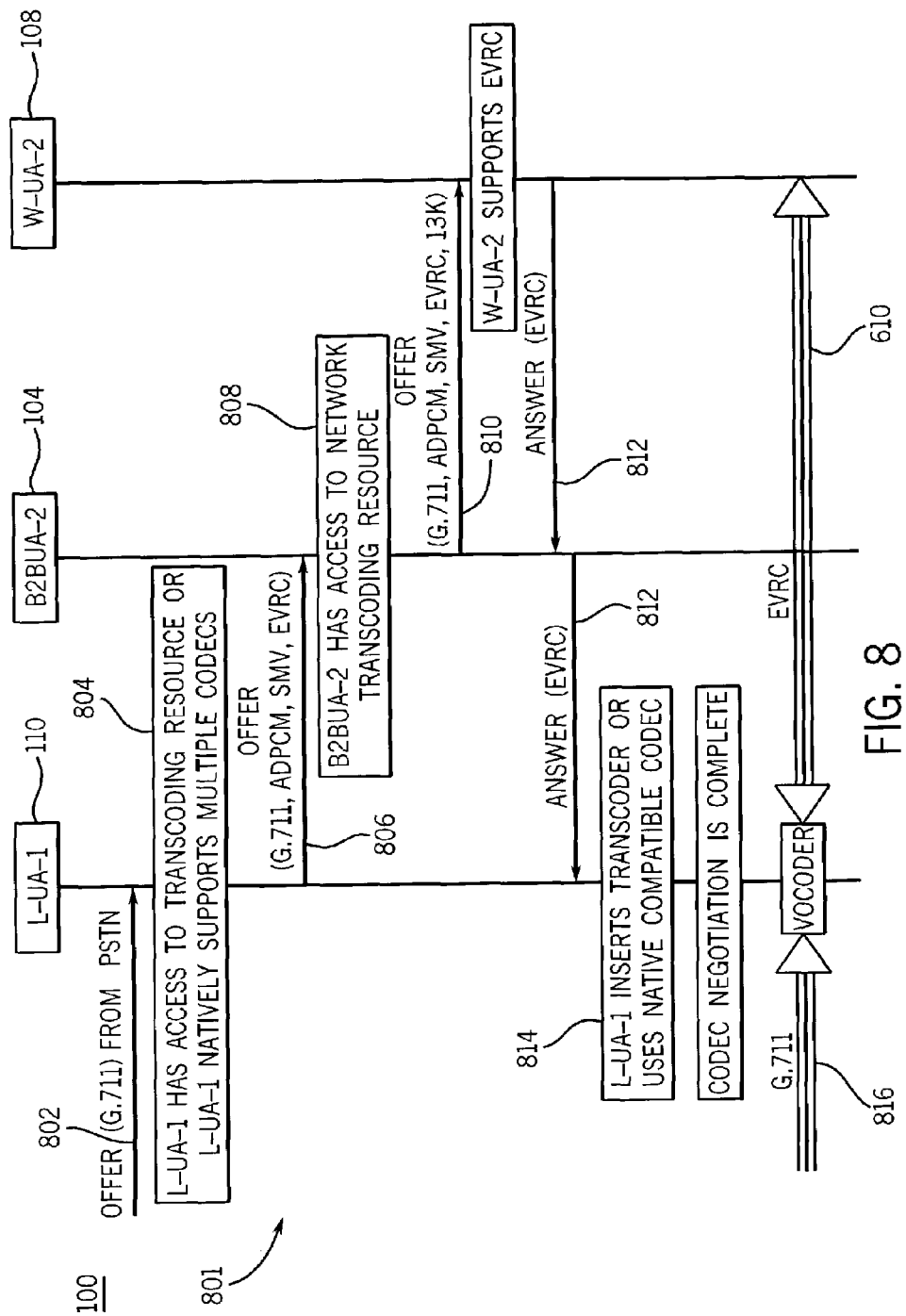
FIG. 8 is a representation of an exemplary message flow for a connection of a call from a landline user agent to a wireless user agent of the plurality of user agents of the apparatus of FIG. 2.

Turning to FIGS. 2 and 8, a call flow 801 represents exemplary connection of a call from the landline user agent 110 to the wireless user agent 108. A user initiates the call with the landline telephone associated with the public switched telephone network 126 and the landline user agent 110. The public switched telephone network 126 generates an offer message 802. The offer message 802 comprises a list of codec formats supported by the public switched telephone network 126. When the public switched telephone network 126 supports more than one codec format, the codec formats in the list are arranged into an order based on a preference of the public switched telephone network 126. In one example, the public switched telephone network 126 supports only one codec format, for example, G.711. The public switched telephone network 126 includes an indication in the offer message 802 that the G.711 codec format is supported.

The public switched telephone network 126 sends the offer message 802 to the landline user agent 110. The landline user agent 110 has access to network transcoder resources 804 and therefore may support a codec format that is not supported by the public switched telephone network 126. In one example, the landline user agent 110 supports the G.711, adaptive differential pulse code modulation, selectable mode vocoder, and enhanced variable rate codec formats. The landline user agent 110 generates an offer message 806. The landline user agent 110 includes an indication in the offer message 806 that the G.711, adaptive differential pulse code modulation, selectable mode vocoder, and enhanced variable rate codec formats are supported. The landline user agent 110 arranges the codec formats into an order by appending the codec formats supported by the landline user agent 110 and unsupported by the public switched telephone network 126 to the end of the list of codec formats in the offer received from public switched telephone network 126.

The landline user agent 110 sends the offer message 806 to the network controller 104. The network controller 104 has access to network transcoder resources 808 and therefore may support a codec format that is not supported by the landline user agent 110 or the public switched telephone network 126. In one example, the network controller 104 supports the G.711, adaptive differential pulse code modulation, selectable mode vocoder, enhanced variable rate codec, and 13k codec formats. The network controller 104 generates an offer message 810. The network controller 104 includes an indication in the offer message 810 that the G.711, adaptive differential pulse code modulation, selectable mode vocoder, enhanced variable rate codec, and 13k codec formats are supported. The network controller 104 arranges the codec formats into an order by appending the codec formats supported by the network controller 104 and unsupported by the landline user agent 110 and public switched telephone network 126 to the end of the list of codec formats in the offer received from the landline user agent 110.

The network controller 104 sends the offer message 810 to the wireless user agent 108. The wireless user agent 108 compares the first codec format in the list (i.e., G.711) with the codec formats supported by the wireless user agent 108. The wireless user agent 108 does not support the G.711 codec format, therefore wireless user agent 108 compares the rest of the codec formats in the list with the codec formats supported by the wireless user agent 108. The wireless user agent 108 finds a codec format from the list that is supported by the wireless user agent 108 (i.e., enhanced variable rate codec). The wireless user agent 108 selects the enhanced variable rate codec format for communication with the wireless user agent 106. The wireless user agent 108 generates an answer message 812 comprising an indication of the enhanced variable rate codec.

The wireless user agent 108 sends the answer message 812 to the network controller 104. The network controller 104 determines that the enhanced variable rate codec format of the answer message 812 is not supported by the public switched telephone network 126. Due to one or more characteristics of the answer message 812 or the availability of the network transcoder resources 808, the network controller 104 decides to send the answer message 812 to the landline user agent 110 without allocating the translator component and reformatting the answer message 812.

The network controller 104 sends the answer message 812 to the landline user agent 110. The network controller 102 determines that the enhanced variable rate codec format of the answer message 812 is not supported by the public switched telephone network 126. Therefore, there is a need for a translator component 814 to translate the media format between the enhanced variable rate codec format as indicated in the answer message 602 and the G.711 codec format supported by the public switched telephone network 126. The landline user agent 110 allocates the translator component 814. In one example, the translator component 814 comprises a vocoder. During communication the public switched telephone network 126 uses the G.711 codec format and the wireless user agent 108 uses the enhanced variable rate codec format. Communication may begin between the public switched telephone network 126 and the translator component 814 using a G.711 codec format path 816. Communication may begin between the wireless user agent 108 and the translator component 814 using the enhanced variable rate codec format path 610.

Figure 9:
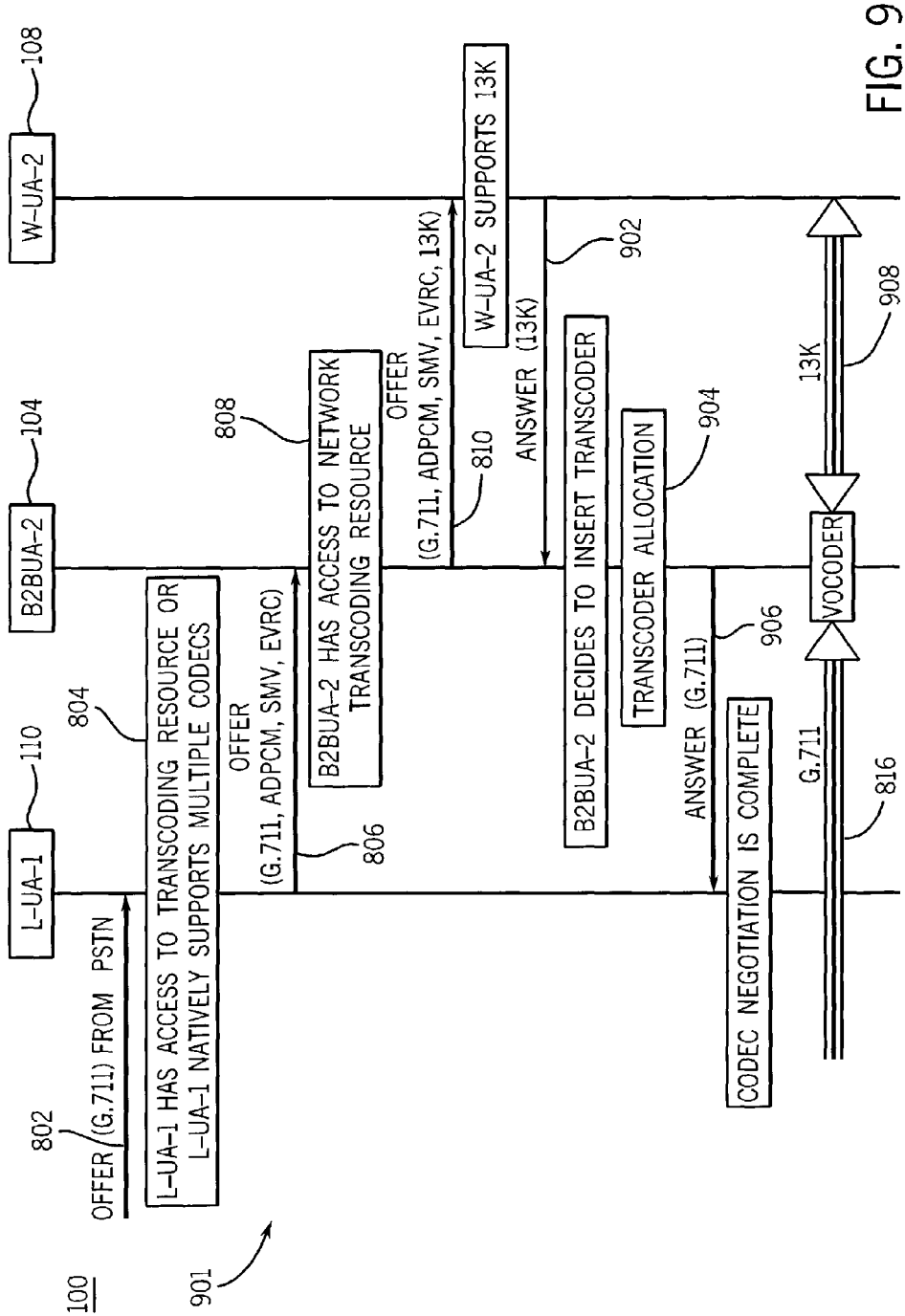
FIG. 9 is a representation of an exemplary message flow for a connection of another call from a landline user agent to a wireless user agent of the plurality of user agents of the apparatus of FIG. 2.

Turning to FIGS. 2 and 9, a call flow 901 represents exemplary connection of another call from the landline user agent 110 to the wireless user agent 108. A user initiates the call with the landline telephone associated with the public switched telephone network 126 and the landline user agent 110. The public switched telephone network 126 sends the offer message 802 to the landline user agent 110. The landline user agent 110 sends the offer message 806 to the network controller 104. The network controller 104 sends the offer message 810 to the wireless user agent 108. The offer message 810 comprises the indication that the G.711, adaptive differential pulse code modulation, selectable mode vocoder, enhanced variable rate codec, and 13k codec formats are supported.

The wireless user agent 108 sends an answer message 902 comprising an indication of a selection of the 13k codec format to the network controller 104. The network controller 104 determines that the 13k codec format of the answer message 902 is not supported by the public switched telephone network 126. Therefore, there is a need for the translator component 904 to translate media format between the 13k codec format indicated in the answer message 902 and the G.711 codec format supported by the public switched telephone network 126. The network controller 104 allocates the translator component 904. The translator component 904 translates the answer message 902 is into an answer message 906. The answer message 906 indicates the G.711 codec format. In one example, the translator component 904 comprises a vocoder. During communication the public switched telephone network 126 uses the G.711 codec format and the wireless user agent 108 the 13k codec format. Communication may begin between the public switched telephone network 126 and the translator component 904 using the G.711 codec format path 816. Communication may begin between the wireless user agent 108 and the translator component 904 using a 13k codec format path 908.

Figure 10:
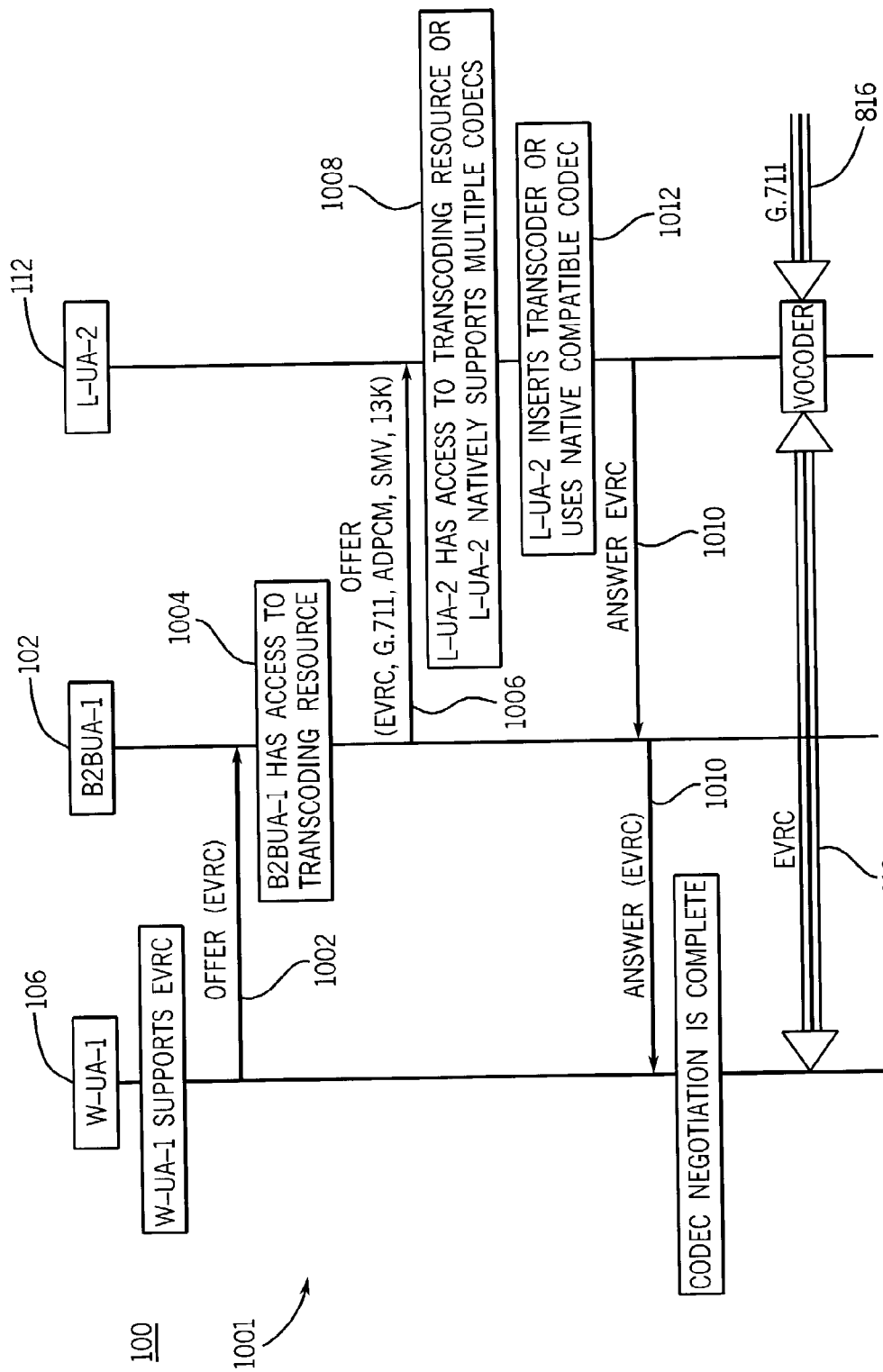
FIG. 10 is a representation of an exemplary message flow for a connection of a call from a wireless user agent to a landline user agent of the plurality of user agents of the apparatus of FIG. 3.

Turning to FIGS. 3 and 10, a call flow 1001 represents exemplary connection of a call from the wireless user agent 106 to the landline user agent 112. A user initiates the call with the wireless telephone associated with the wireless user agent 106. The wireless user agent 106 generates an offer message 1002. The offer message 1002 comprises a list of codec formats supported by the wireless user agent 106. The wireless user agent 106 supports one codec format, for example, the enhanced variable rate codec format. The wireless user agent 106 includes an indication in the offer message 1002 that the enhanced variable rate codec format is supported.

The wireless user agent 106 sends the offer message 1002 to the network controller 102. The network controller 102 has access to network transcoder resources 1004 and therefore may support a codec format that is not supported by the wireless user agent 106. In one example, the network controller 102 supports the enhanced variable rate codec, G.711, adaptive differential pulse code modulation, selectable mode vocoder, and 13k codec formats. The network controller 102 generates an offer message 1006. The network controller 102 includes an indication in the offer message 1006 that the enhanced variable rate codec, G.711, adaptive differential pulse code modulation, selectable mode vocoder, and 13k codec formats are supported. The network controller 102 arranges the codec formats into an order by appending the codec formats supported by the network controller 102 and unsupported by the wireless user agent 106 to the end of the list of codec formats supported by the wireless user agent 106.

The network controller 102 sends the offer message 1006 to the landline user agent 112. The landline user agent 112 has access to network transcoder resources 1008 and therefore may support a codec format that is not supported by the public switched telephone network 128. The landline user agent 112 selects a codec format (i.e., enhanced variable rate codec) from the list that is supported by the wireless user agent 108 for communication with the wireless user agent 106. The landline user agent 112 allocates a translator component 1012 between the public switched telephone network 128 and the network controller 102. The translator component 1012 translates messages between G.711 and enhanced variable rate codec formats. The landline user agent 112 generates an answer message 1010 comprising an indication of the enhanced variable rate codec format.

The landline user agent 112 sends the answer message 1010 to the network controller 102. The network controller 102 determines that the enhanced variable rate codec format of the answer message 1010 is supported by the wireless user agent 106. Therefore, there is no need to allocate a translator component to translate the enhanced variable rate codec format of the answer message 1010 to a different codec format.

The network controller 102 sends the answer message 1010 to the wireless user agent 106. During communication the wireless user agent 106 uses the enhanced variable rate codec format and the public switched telephone network 128 uses the G.711 codec format. Communication may begin between the wireless user agent 106 and the translator component 1012 using the enhanced variable rate codec format path 610. Communication may begin between the public switched telephone network 128 and the translator component 1012 using the G.711 codec format path 816.

Figure 11:
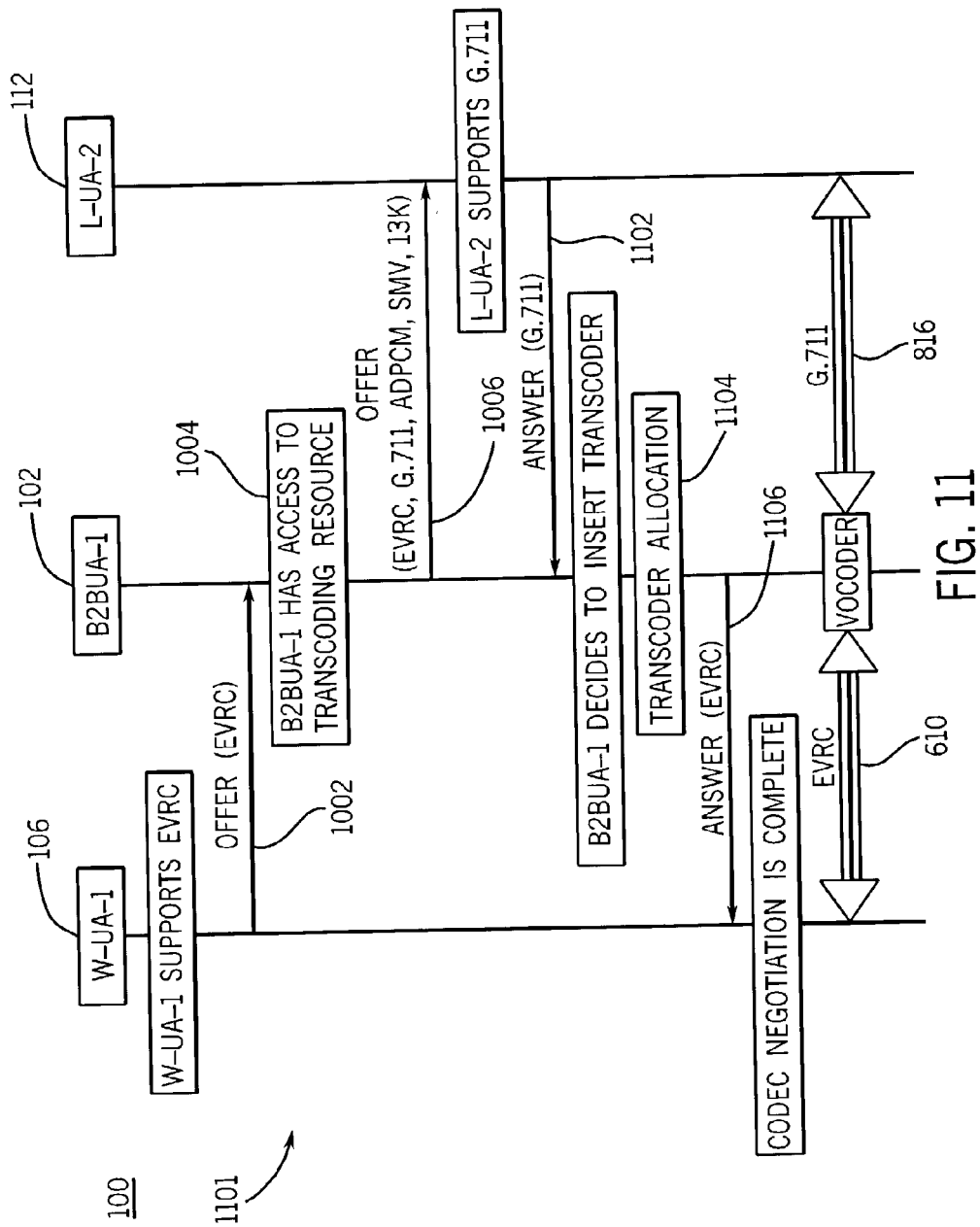
FIG. 11 is a representation of an exemplary message flow for a connection of another call from a wireless user agent to a landline user agent of the plurality of user agents of the apparatus of FIG. 3.

Turning to FIGS. 3 and 11, a call flow 1101 represents exemplary connection of another call from the wireless user agent 106 to the landline user agent 112. A user initiates the call with the wireless telephone associated with the wireless user agent 106. The wireless user agent 106 generates an offer message 1002. The wireless user agent 106 sends the offer message 1002 to the network controller 102. The network controller 102 sends the offer message 1006 to the landline user agent 112. The offer message 1006 comprises the indication that the enhanced variable rate codec, G.711, adaptive differential pulse code modulation, selectable mode vocoder, and 13k codec formats are supported. The landline user agent 112 selects the G.711 codec format for communication with the wireless user agent 106. The landline user agent 112 generates an answer message 1102 comprising an indication of the G.711 codec format.

The landline user agent 112 sends the answer message 1102 to the network controller 102. The network controller 102 determines that the G.711 codec format of the answer message 1102 is not supported by the wireless user agent 106. Therefore, there is a need for a translator component 1104 to translate the media format between the G.711 codec format indicated in the answer message 1102 and the enhanced variable rate codec format supported by the wireless user agent 106. The network controller 104 allocates the translator component 1104. The translator component 1104 translates the media format between the G.711 code format indicated in the answer message 1102 and the enhanced variable rate codec format indicated in the answer message 1106. In one example, the translator component 1104 comprises a vocoder.

The network controller 102 sends the answer message 1106 to the wireless user agent 106. During communication wireless user agent 106 uses the enhanced variable rate codec format and the landline user agent 112 uses the G.711 codec format. Communication may begin between the wireless user agent 106 and the translator component 1104 using the enhanced variable rate codec format path 610. Communication may begin between the landline user agent 112 and the translator component 1104 using the G.711 codec format path 816.

Figure 4:
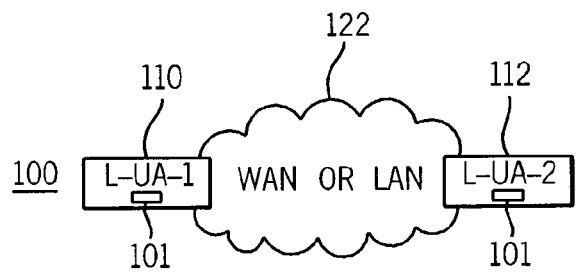
FIG. 4 is a representation of one example of an apparatus that comprises one or more network controllers, the one or more network controllers communicatively couple a plurality of landline user agents.
Figure 12:
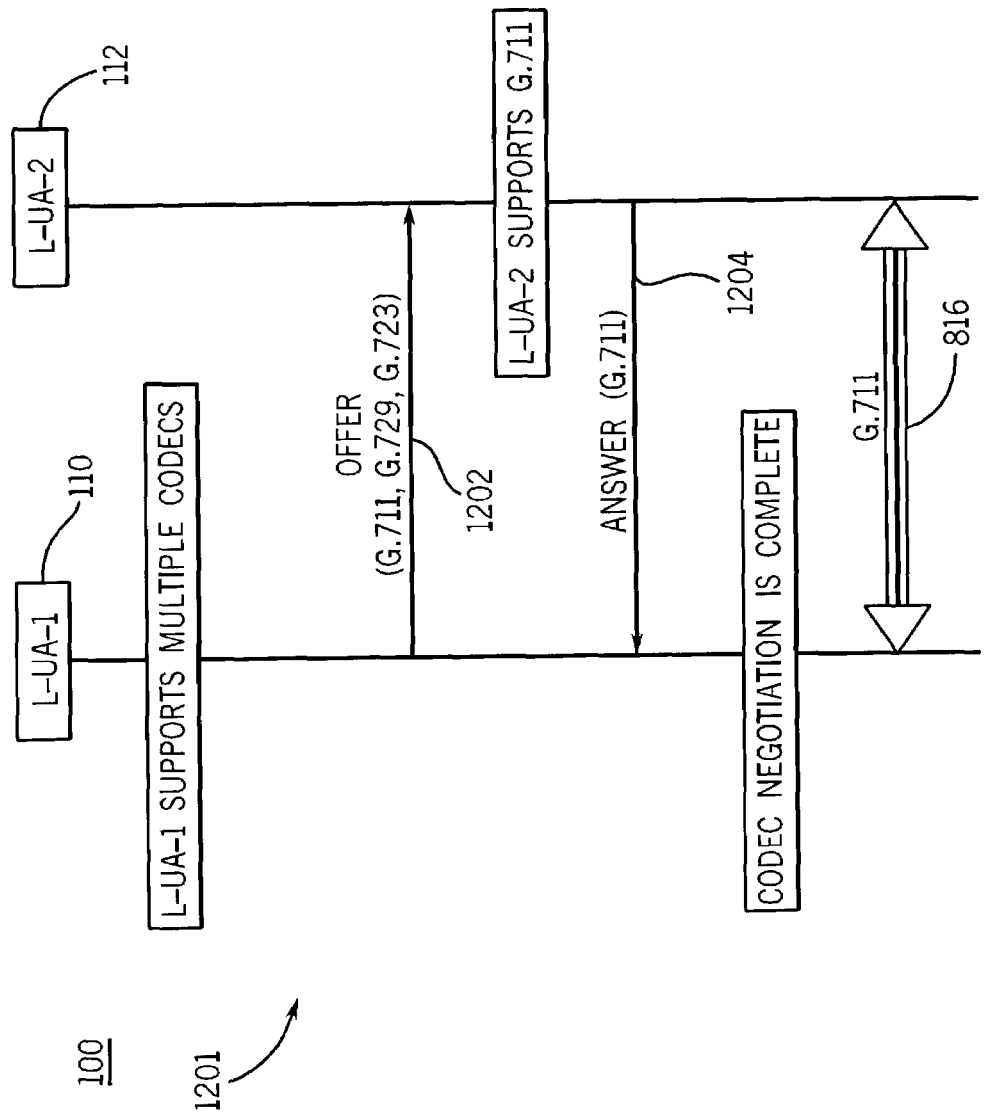
FIG. 12 is a representation of an exemplary message flow for a connection of a call from a first landline user agent to a second landline user agent of the plurality of landline user agents of the apparatus of FIG. 4.

Turning to FIGS. 4 and 12, a call flow 1201 represents exemplary connection of a call from the landline user agent 110 to the landline user agent 112. A user initiates the call with the landline telephone associated with the landline user agent 110. The landline user agent 110 generates an offer message 1202. The offer message 1202 comprises a list of codec formats supported by the landline user agent 110. The landline user agent 110 supports the G.711, G.729, and G.723 codec formats. The landline user agent 110 includes an indication in the offer message 1202 that the G.711, G.729, and G.723 codec formats are supported.

The landline user agent 110 sends the offer message 1202 to the landline user agent 112. The landline user agent 112 supports the G.711 codec format, therefore landline user agent 112 selects the G.711 codec format for communication with the landline user agent 110. The landline user agent 110 generates an answer message 1204 comprising an indication of the G.711 codec format. The landline user agent 112 sends the answer message 1204 to the landline user agent 110. Communication may begin between the landline user agent 110 and the landline user agent 112 using the G.711 codec format path 816.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the step of:

allowing through one or more network controllers a second user agent to communicate with a first user agent through employment of a codec format unsupported by the first user agent, wherein the one or more network controllers support a) selectable mode vocoder, b) G.711, c) adaptive differential pulse code modulation, d) enhanced variable rate codec and e) 13 k codec formats;

translating by one or more of the one or more network controllers one or more media packets of the codec format unsupported by the first user agent to one or more media packets of a codec format that is supported by the first user agent;

wherein the one or more network controllers comprise first and second network controllers, and wherein the step of translating by the one or more of the one or more network controllers the one or more media packets of the codec format unsupported by the first user agent to the one or more media packets of the codec format that is supported by the first user agent comprises the steps of:

evaluating by the second network controller one or more characteristics of a signaling message; and determining based on the one or more characteristics by the second network controller whether to allocate a gateway that serves to translate a subsequent media packet of the one or more media packet of the codec format unsupported by the first user agent to a media packet of the one or more media packets of the codec format that is supported by the first user agent or to send the subsequent media packet of the one or more media packets of the codec format unsupported by the first user agent to the first network controller to be translated to the media packet of the one or more media packets of the codec format that is supported by the first user agent;

wherein the one or more characteristics of the signaling message comprise the codec format of the subsequent media packet, wherein the step of evaluating by the second network controller the one or more characteristics of the signaling message comprises the steps of:

comparing a first number of bits used to represent the subsequent media packet of the codec format unsupported by the first user agent and a second number of bits used to represent the media packet of the codec format that is supported by the first user agent;

determining to translate by the second network controller the subsequent media packet of the one or more media packets of the codec format unsupported by the first user agent to the media packet of the one or more media packets of the codec format that is supported by the first user agent if the first number is greater than the second number; and determining to ignore the subsequent media packet of the one or more media packets of the codec format unsupported by the first user agent.

2. The method of claim 1 further comprising the step of:

allowing through one or more of the one or more network controllers the first user agent to communicate with the second user agent through employment of a codec format unsupported by the second user agent.

3. The method of claim 2, wherein the step of allowing through the one or more of the one or more network controllers the first user agent to communicate with the second user agent through employment of the codec format unsupported by the second user agent comprises the step of:

translating by one or more of the one or more network controllers one or more media packets of the codec format unsupported by the second user agent to one or more media packets of a codec format that is supported by the second user agent.

4. The method of claim 1, wherein the step of allowing through the one or more network controllers the second user agent to communicate with the first user agent through employment of the codec format unsupported by the first user agent comprises the steps of:

generating a list of one or more codec formats supported by the first user agent;

appending the list with one or more codec formats supported by the one or more network controllers that are unsupported by the first user agent; and employing the list to select a codec format unsupported by the first user agent for communication by the second user agent.

5. The method of claim 4, wherein the step of generating the list of one or more codec formats supported by the first user agent comprises the steps of:

arranging an order for the one or more codec formats supported by the first user agent in the list from highest voice quality to lowest voice quality; and sending the list from the first user agent to one or more of the one or more network controllers.

6. The method of claim 4, wherein the step of employing the list to select the codec format unsupported by the first user agent for communication by the second user agent comprises the steps of:

selecting by the second user agent the codec format from the list of the one or more codec formats supported by the one or more network controllers that are unsupported by the first user agent; and sending an indication of the codec format selected by the second user agent from the second user agent to one or more of the one or more network controllers.

7. The method of claim 1, wherein the one or more network controllers comprise first and second network controllers, and wherein the step of translating by the one or more of the one or more network controllers the one or more media packets of the codec format unsupported by the first user agent to the one or more media packets of the codec format that is supported by the first user agent comprises the steps of:

sending a signaling message from the second user agent to the second network controller;

sending the signaling message from the second network controller to the first network controller; and translating by the first network controller a subsequent media packet of the one or more media packets of the codec format unsupported by the first user agent to a media packet of the one or more media packets of the codec format that is supported by the first user agent.

8. A method, comprising the step of:

allowing through one or more network controllers a second user agent to communicate with a first user agent through employment of a codec format unsupported by the first user agent, wherein the one or more network controllers support a) selectable mode vocoder, b) G.711, c) adaptive differential pulse code modulation, d) enhanced variable rate codec and e) 13 k codec formats;

translating by one or more of the one or more network controllers one or more media packets of the codec format unsupported by the first user agent to one or more media packets of a codec format that is supported by the first user agent;

wherein the one or more network controllers comprise first and second network controllers, and wherein the step of translating by the one or more of the one or more network controllers the one or more media packets of the codec format unsupported by the first user agent to the one or more media packets of the codec format that is supported by the first user agent comprises the steps of:

evaluating by the second network controller a traffic level or available resources of a network carrying the one or more media packets; and determining based on the traffic level or the available resources of the network by the second network controller whether to:

allocate a gateway that serves to translate a subsequent media packet of the one or more media packets of the codec format unsupported by the first user agent to a media packet of the one or more media packets of the codec format that is supported by the first user agent, or ignore the subsequent media packet of the one or more media packets of the codec format unsupported by the first user agent.

9. The method of claim 8 further comprising the step of:

allowing through one or more of the one or more network controllers the first user agent to communicate with the second user agent through employment of a codec format unsupported by the second user agent.

10. The method of claim 9, wherein the step of allowing through the one or more of the one or more network controllers the first user agent to communicate with the second user agent through employment of the codec format unsupported by the second user agent comprises the step of:

translating by one or more of the one or more network controllers one or more media packets of the codec format unsupported by the second user agent to one or more media packets of a codec format that is supported by the second user agent.

11. The method of claim 8, wherein the step of allowing through the one or more network controllers the second user agent to communicate with the first user agent through employment of the codec format unsupported by the first user agent comprises the steps of:

generating a list of one or more codec formats supported by the first user agent;

appending the list with one or more codec formats supported by the one or more network controllers that are unsupported by the first user agent; and employing the list to select a codec format unsupported by the first user agent for communication by the second user agent.

12. The method of claim 11, wherein the step of generating the list of one or more codec formats supported by the first user agent comprises the steps of:

arranging an order for the one or more codec formats supported by the first user agent in the list from highest voice quality to lowest voice quality; and sending the list from the first user agent to one or more of the one or more network controllers.

13. The method of claim 11, wherein the step of employing the list to select the codec format unsupported by the first user agent for communication by the second user agent comprises the steps of:

selecting by the second user agent the codec format from the list of the one or more codec formats supported by the one or more network controllers that are unsupported by the first user agent; and sending an indication of the codec format selected by the second user agent from the second user agent to one or more of the one or more network controllers.

14. The method of claim 8, wherein the one or more network controllers comprise first and second network controllers, and wherein the step of translating by the one or more of the one or more network controllers the one or more media packets of the codec format unsupported by the first user agent to the one or more media packets of the codec format that is supported by the first user agent comprises the steps of:

sending a signaling message from the second user agent to the second network controller;

sending the signaling message from the second network controller to the first network controller; and translating by the first network controller a subsequent media packet of the one or more media packets of the codec format unsupported by the first user agent to a media packet of the one or more media packets of the codec format that is supported by the first user agent.

15. A method, comprising the step of:

allowing through one or more network controllers a second user agent to communicate with a first user agent through employment of a codec format unsupported by the first user agent;

translating by one or more of the one or more network controllers one or more media packets of the codec format unsupported by the first user agent to one or more media packets of a codec format that is supported by the first user agent;

wherein the one or more network controllers comprise first and second network controllers, and wherein the step of translating by the one or more of the one or more network controllers the one or more media packets of the codec format unsupported by the first user agent to the one or more media packets of the codec format that is supported by the first user agent comprises the steps of:

evaluating by the second network controller one or more characteristics of a signaling message; and determining based on the one or more characteristics by the second network controller whether to allocate a gateway that serves to translate a subsequent media packet of the one or more media packet of the codec format unsupported by the first user agent to a media packet of the one or more media packets of the codec format that is supported by the first user agent or to send the subsequent media packet of the one or more media packets of the codec format unsupported by the first user agent to the first network controller to be translated to the media packet of the one or more media packets of the codec format that is supported by the first user agent;

wherein the one or more characteristics of the signaling message comprise the codec format of the subsequent media packet, wherein the step of evaluating by the second network controller the one or more characteristics of the signaling message comprises the steps of:

comparing a first number of bits used to represent the subsequent media packet of the codec format unsupported by the first user agent and a second number of bits used to represent the media packet of the codec format that is supported by the first user agent;

determining to translate by the second network controller the subsequent media packet of the one or more media packets of the codec format unsupported by the first user agent to the media packet of the one or more media packets of the codec format that is supported by the first user agent if the first number is greater than the second number; and determining to ignore the subsequent media packet of the one or more media packets of the codec format unsupported by the first user agent.

16. A method, comprising the step of:

allowing through one or more network controllers a second user agent to communicate with a first user agent through employment of a codec format unsupported by the first user agent;

translating by one or more of the one or more network controllers one or more media packets of the codec format unsupported by the first user agent to one or more media packets of a codec format that is supported by the first user agent;

wherein the one or more network controllers comprise first and second network controllers, and wherein the step of translating by the one or more of the one or more network controllers the one or more media packets of the codec format unsupported by the first user agent to the one or more media packets of the codec format that is supported by the first user agent comprises the steps of:

evaluating by the second network controller a traffic level or available resources of a network carrying the one or more media packets; and determining based on the traffic level or the available resources of the network by the second network controller whether to:

allocate a gateway that serves to translate a subsequent media packet of the one or more media packets of the codec format unsupported by the first user agent to a media packet of the one or more media packets of the codec format that is supported by the first user agent, or ignore the subsequent media packet of the one or more media packets of the codec format unsupported by the first user agent.

* * * * *